United States Patent
Klein et al.

(10) Patent No.: US 6,307,082 B1
(45) Date of Patent: Oct. 23, 2001

(54) SYNERGISTIC CATALYST SYSTEM AND PROCESS FOR CARRYING OUT HYDROSILYLATION REACTIONS

(75) Inventors: Klaus Dieter Klein, Mülheim; Wilfried Knott; Dagmar Windbiel, both of Essen, all of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/510,679

(22) Filed: Feb. 22, 2000

(30) Foreign Application Priority Data

Feb. 24, 1999 (DE) ................................................ 199 07 814

(51) Int. Cl.[7] ....................................................... C07F 7/08
(52) U.S. Cl. ............................................................. 556/479
(58) Field of Search ................................................ 556/479

(56) References Cited

U.S. PATENT DOCUMENTS 2,823,218 * 2/1958 Speier et al. ......................... 556/479

* cited by examiner

*Primary Examiner*—Paul F. Shaver
(74) *Attorney, Agent, or Firm*—Frommer Lawrence & Haug LLP

(57) ABSTRACT

The invention relates to a process for the transition metal-catalyzed addition of SiH-containing poly-siloxanes onto olefinic compounds, wherein the catalyst used is a combination of at least two compounds of platinum metals, and also to a corresponding catalyst system.

7 Claims, No Drawings

SYNERGISTIC CATALYST SYSTEM AND PROCESS FOR CARRYING OUT HYDROSILYLATION REACTIONS

RELATED APPLICATIONS

This application claims priority to German application No. 199 07 814.9, filed on Feb. 24, 1999, herein incorporating by reference.

BACKGROUND OF THE INVENTION

The invention relates to a synergistic catalyst system and a process for carrying out hydrosilylation reactions.

Modified siloxanes, in particular organomodified siloxanes, are becoming increasingly important because of their largely definable property profile.

FIELD OF THE INVENTION

A basic synthetic strategy of producing this class of compound employs transition metal-catalyzed addition of SiH-containing silicones onto olefinic compounds (hydrosilylation). Among the many reactions which can be carried out according to this coupling principle, it is possible to distinguish those whose aim is to produce siloxanes having very high degrees of modification, for example derivatives of poly(methylhydrogen)siloxane.

In view of the strongly exothermic nature of SiC-coupling reactions, reactions of poly(methylhydrogen)-siloxanes, particularly in combination with very reactive olefins, represent a considerable hazard potential in large-scale industrial production of organo-modified siloxanes.

The difficulties in the case of these hydrosilylation reactions having a high thermodynamic potential are compounded by a fluctuation in the reaction kinetics caused by partial deactivation of the catalyst used. The partial deactivation of compounds active as homogeneous catalysts can frequently be recognized by the precipitation of dark-colored noble metal derivatives from the hydrosilylation mixtures.

For this reason, sufficiently prompt reaction of the reactants is of key importance for safe industrial implementation. Otherwise, a significantly reduced reaction rate leads to the build-up of undesirable starting material concentrations which subsequently cause operating conditions which are difficult to control when the reaction recommences later (exothermic surge).

Going beyond the safety aspect, the product quality which is achievable in such reactions also depends on the avoidance of uncontrolled accumulation of starting materials, since, for example, the tendency to gel formation is known as an undesirable secondary reaction in the hydrosilylation of hydrogen-rich SiH-siloxanes.

OBJECT OF THE INVENTION

It is therefore an object of the invention to maintain a constantly high catalytic activity over the entire course of the reaction.

SUMMARY OF THE INVENTION

It has now surprisingly been found that specific combination of two or more compounds of platinum metals (e.g.: $H_2PtCl_6$ with $RuCl_3 \times nH_2O$) in-situ generates a catalyst system which ensures safe, prompt reaction of SiH-rich hydrogensiloxanes even in reaction matrices which have been found by experience not to stabilize proven noble metal catalysts sufficiently.

A person skilled in the art could not have foreseen that the combination of two or more noble metal compounds defines a catalytic activity which can be deduced from neither the individual influence of component A nor from the separate influences of each of the components B, C, . . . (see comparative experiments Examples 1 and 2 and 5).

Although hexachloroplatinic acid $H_2PtCl_6$ as sole catalyst leads to high final SiH conversions, it tends to cause reactant accumulations which lead to violent spontaneous reactions (Example 1). Ruthenium(III) chloride hydrate is on its own not a convincing catalyst in these reaction systems (Example 2). The activity of rhodium(III) chloride hydrate as catalyst in this reaction is similarly weak (Example 5).

The overproportional catalytic efficiency of a plurality of individual components found here as a result of their combination can therefore be described as a synergistic interaction.

A combination comprising, for example, metal-equivalent proportions of $H_2PtCl_6$ and $RuCl_3 \times nH_2O$ allows the course of the reaction in highly concentrated SiH-containing systems to be determined purely by the addition rate of further reactants.

In a modified embodiment of the present invention, it is also possible to introduce the two catalyst components one after the other in a sequential addition reaction (Example 4).

EXAMPLES

Example 1 (Not According to the Invention)

100.0 g of poly(methylhydrogen)siloxane (SiH content: 16.16 eq/kg) together with 9.6 g of α-methylstyrene (5 eq %) were placed in a 500 ml four-neck flask which had been made inert with argon and was fitted with a precision glass stirrer, dropping funnel, internal thermometer and reflux condenser and the mixture was heated to 80° C. At this temperature, 170 µl of a 10% strength solution of hexachloroplatinic acid in isopropanol were added.

An aggregation of the catalyst in the form of black threads in the region of the thermometer around which the reaction mixture flowed was observed. The heat of reaction liberated led to a temperature rise to 98° C. After the exothermic reaction had abated, the mixture was heated to 125° C. and 47.7 g of α-methylstyrene (25 eq %) were added dropwise over a period of one hour.

The absence of evolution of heat during this reaction phase indicated accumulation of unreacted reactants. After the addition was complete, an attempt was made to counter the lack of reaction by gradually increasing the temperature to 140° C. The mixture was then cooled to 125° C. and 195.8 g (70 eq %+5% by mass excess) of 1-dodecene were added dropwise. The reaction which occurred violently and spontaneously during this addition made it necessary to employ auxiliary cooling to prevent the reaction temperature from rising above 142° C.

Time of addition: 45 minutes

After further reaction for one hour, the SiH conversion determined gas-volumetrically was 95.3%.

Example 2 (Not According to the Invention)

Using a method analogous to Example 1, 100 g of poly(methylhydrogen)siloxane having an SiH content of 16.16 eq/kg and 9.6 g of α-methylstyrene (5 mol %) were placed in a 500 ml four-neck flask and 7.36 mg of $RuCl_3 \times 4H_2O$ (15 ppm of Ru, dissolved in 2 ml of isopropanol) were added. This mixture was heated to 140° C. At this temperature, the remaining amount of α-methylstyrene (47.7 g, corresponding to 25 eq %) was added, during which addition a steady gas evolution was observed. After the addition was complete, the temperature dropped to 136° C., resulting in cessation of gas evolution.

Subsequently, 1-dodecene was added dropwise at 140° C. In order to maintain the prescribed temperature (no exothermic reaction), the mixture had to be heated continuously during the dropwise addition.

After a further reaction time of two hours, an SiH conversion of only 22.05% was determined by means of the gas-volumetric method.

Example 3

Using a method analogous to Example 2, 100 g of poly(methylhydrogen)siloxane (SiH content: 16.16 eq/kg) together with 5 eq % of α-methylstyrene (9.6 g) were placed in a flask which had been made inert and an isopropanol solution of $RuCl_3 \times 4H_2O$ (9.8 mg corresponding to 10 ppm of Ru) together with 124 μl of $H_2PtCl_6$ corresponding to 10 ppm of Pt (10% strength in isopropanol) were subsequently added.

The reddish brown mixture foamed immediately and displayed a little gas evolution.

Gentle heating to 30° C. caused an exothermic reaction with a temperature rise to 45° C. On further heating, the mixture went through the colors dark green and blue.

At 80° C., the remaining α-methylstyrene (47.70 g) was added dropwise. During the addition, the temperature rose to 100° C. The permanent activity of the catalyst allowed the reaction temperature to be controlled purely by varying the rate of the dropwise addition. After the addition was complete, the temperature was increased further by 5–10° C. in order to ensure that the α-methylstyrene had all undergone the addition reaction (time of dropwise addition: about 30 min).

After an after-reaction phase of 10 minutes, 195.8 g of 1-dodecene were added at about 110° C. During the further addition (1 hour), the temperature was gradually increased to 140° C. The SiH conversion determined by the gas-volumetric method was 98.1% at the end of the dropwise addition.

Example 4

Using a method analogous to Example 3, 100.0 g of methylhydrogenpolysiloxane (SiH content: 16.16 eq/kg) together with 9.6 g of α-methylstyrene and 9.8 mg of $RuCl_3 \times 4H_2O$ (corresponding to 10 ppm of Ru, dissolved in 2 ml of isopropanol) were placed in the reaction flask under a blanket of Ar and the mixture was heated to 50° C. At about 35° C., a change in color occurred, firstly from reddish brown via yellow to green and finally to blue. At 50° C., the heat of reaction liberated led to a temperature rise to 75° C., with the mixture becoming virtually colorless.

After the exothermic reaction had abated, the mixture was cooled to about 22° C. and then admixed with 124 μl of a 10% strength hexachloroplatinic acid solution in isopropanol (corresponding to 10 ppm of Pt). This resulted in immediate evolution of gas. Over a period of 10 minutes and at 40° C., 47.7 g of α-methylstyrene were first metered in. The final hydrosilylation using 195.8 g of 1-dodecene was carried out within 40 minutes at reaction temperatures of ≦110° C.

The SiH conversion determined by the gas-volumetric method was already 96.3% at the end of the dropwise addition.

Example 5 (Not According to the Invention)

100.0 g of methylhydrogenpolysiloxane (SiH content: 15.85 eq/kg) together with 9.6 g of α-methylstyrene and 26.1 mg of $RhCl_3 \times 3H_2O$ (corresponding to 30 ppm of Rh, dissolved in 0.3 ml of isopropanol) were placed in the reaction flask under a blanket of Ar and the mixture was heated to 75° C. Over the course of 45 minutes, 25.0 eq % (46.8 g) of α-methylstyrene were metered in, with the reaction temperature being increased steadily to 100° C. Subsequently, 70 eq % (196.8 g) of 1-dodecene were added while increasing the temperature from 110° C. to 150° C.

The reaction mixture, which displayed no appreciable evolution of heat in all phases of the reaction, reached an SiH conversion determined by the gas-volumetric method of 63% one hour after the end of the dropwise addition. This conversion no longer changed even after a further reaction time of 3 hours.

Example 6

In strict analogy to Example 5, a reaction was carried out using a mixed rhodium/platinum catalyst system (14.1 mg $H_2PtCl_6$ (15 ppm)+$RhCl_3 \times 3H_2O$ (15 ppm)). After the addition of the noble metal compounds, an exothermic reaction was found at 60° C. in the first heating phase, so that the reaction of the two olefinic reactants occurred steadily and in a controlled manner with the metered addition.

1 hour after the end of the dropwise addition, an SiH conversion of 95.8% was determined by the gas-volumetric method.

Example 7

The procedure of Example 6 was repeated using a catalyst system comprising three noble metals (9.7 mg $RuCl_3 \times 3H_2O$, 8.7 mg $RhCl_3 \times 3H_2O$, 9.4 mg $H_2PtCl_6 \times 6H_2O$ (each 10 ppm)). Here too, an early evolution of heat occurred at 60° C. and this determined the progress of the further addition reaction SiH conversion (1 hour after the dropwise addition) was 97.2%.

The above description of the invention is intended to be illustrated and not limiting. Various changes in the embodiment described may occur to those skilled in the art. These changes can be made without departing from the spirit or scope of the invention.

What we claim is:

1. A process for the hydrosilation of hydrogen siloxanes with olefinic compounds, which comprises adding SiH-containing polysiloxanes to olefinic compounds in the presence of a transition-metal catalyst, wherein the catalyst is generated in situ by combining at least two compounds of platinium metals.

2. The process as claimed in claim 1, wherein the two compounds of platinum metals are a platinum containing compound and a ruthenium-containing compound.

3. The process as claimed in claim 2, wherein the two compounds of platinum metals are $H_2PtCl_6$ and $RuCl_3 \times nH_2O$.

4. The process as claimed in claim 1, wherein the compounds of platinium metals are combined concurrently.

5. The process as claimed in claim 1, wherein the compounds of platinum metals are combined sequentially.

6. The process as claimed in claim 1, wherein the SiH-containing siloxane is a poly(methylhydrogen) siloxane and the olefinic compound is α-methylstyrene.

7. The process as claimed in claim 1 wherein the catalyst is generated in situ by adding three compounds of platinum metals.

* * * * *